April 11, 1961 R. H. PETERSON 2,978,922
RESOLVER MECHANISMS
Filed Feb. 25, 1955
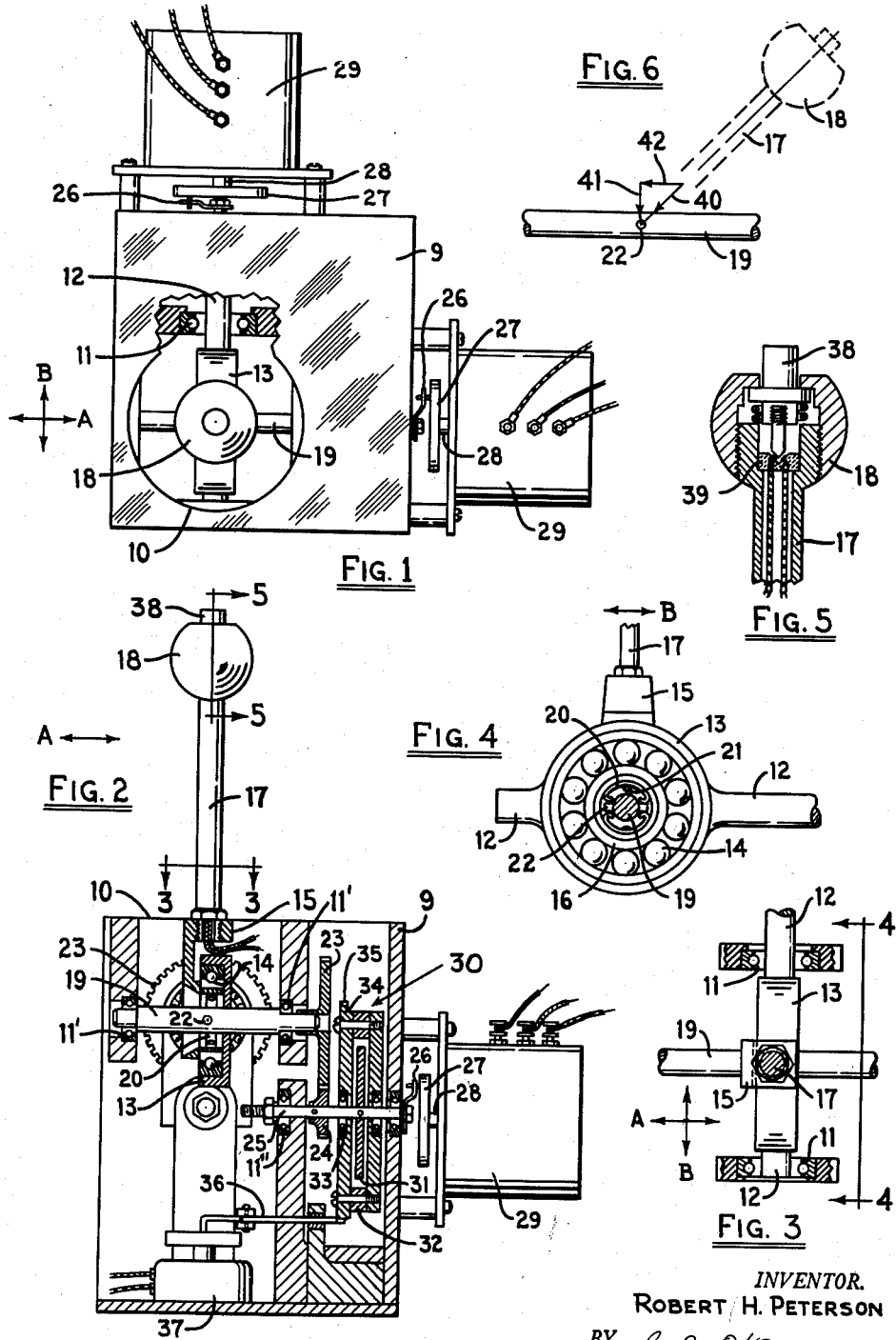
INVENTOR.
ROBERT H. PETERSON
BY
ATTYS.

United States Patent Office 2,978,922
Patented Apr. 11, 1961

2,978,922
RESOLVER MECHANISMS

Robert H. Peterson, Woodbury Heights, N.J., assignor, by mesne assignments, to the United States of America as represented by the Secretary of the Navy Filed Feb. 25, 1955, Ser. No. 490,701

5 Claims. (Cl. 74—471)

The present invention relates to a resolver mechanism and more particularly to a device that will resolve the position of a point or location into rectangular or Cartesian coordinates and provide either a mechanical or electrical display or reading.

One particular use of the device described herein would be for checking or measuring the position of a target on an oscilloscope or radar screen. A target normally appears on a scope as a bright point, commonly called a pip, and it is often desirable to know the rectangular coordinates of the point with respect to the center of the scope or screen.

Heretofore the positions on scopes and radar screens were determined by adjusting a lever or handwheel for both the ordinate reading and the abscissa reading, and thus both hands of the operators were needed to check the position of a point or target.

The novel invention described herein permits an operator to measure or check both coordinates of a point by the use of a single lever. The device described would not necessarily be limited to use with oscilloscopes or radar screens but could be used whenever it is desirable to introduce two components, either electrical or mechanical, into a circuit or system. It is accordingly an object of the present invention to provide a compact mechanism that will provide two outputs from a single control lever.

Other objects and many of the attendant advantages of this invention will be readily appreciated as the same becomes better understood by reference to the following detailed description when considered with the accompanying drawing wherein;

Fig. 1 is a top view of the complete invention partially broken away to show a bearing;

Fig. 2 is a side view of the invention, partly in section;

Fig. 3 is a sectional view taken on line 3—3 of Fig. 2 and shows the relationship of the shafts;

Fig. 4 is a sectional view taken on line 4—4 of Fig. 3;

Fig. 5 is a sectional view taken on line 5—5 of Fig. 2; and

Fig. 6 is a vector diagram showing forces on a pin.

Referring now to the drawing, wherein like reference characters designate like or corresponding parts throughout the several views, there is shown in Figs. 1 and 2 of the drawing a housing 9, having a circular opening 10, in which bearings 11 support a disjointed shaft 12. Figs. 3 and 4 of the drawing show that each half of the disjointed shaft 12 are secured, as by welding, to a circular retainer 13. A large ball bearing 14 is secured inside the circular retainer 13 and a tubular portion of a yoke 15 is press fitted inside the inner race 16 of the ball bearing 14. A vertical shaft 17 having a spherical ball 18 on one end, is threaded to the yoke 15 to form a hand lever which extends through the circular opening 10.

Referring again to Figs. 1 and 2 of the drawing it can be seen that a second shaft 19 is supported in bearings 11′, perpendicular to the longitudinal axis of the disjointed shaft 12, the second shaft 19 passing through the tubular portion of the yoke 15 which is press fitted inside the inner race 16. Referring now to Figs. 2 and 4 of the drawing it is shown that a pair of shoes 20 are secured to the inner tubular surface of the yoke 15 by means of rivets 21. The shoes 20 which can be made of any suitable spring material, contact a pin 22 which extends diametrically through the second snaft 19 and it can readily be seen that any motion of the yoke 15 which rotates the inner race 16 will be picked up by the shoes 20 and thus drive the second shaft 19.

The disjointed shaft 12 and the second shaft 19 each have a gear 23 pinned to one end. Referring now to Fig. 2 of the drawing, it can be seen that the gear 23 drives a smaller gear 24 which is pinned to a shaft 25, and that a female coupling 26, which is on one end of the shaft 25, engages with a male coupling 27 and thus drives the shaft 28 of a potentiometer 29. A similar gearing and coupling arrangement is used to drive a second potentiometer 29 by the disjointed shaft 12. Since the movement of the vertical snaft 17 is relatively limited, the gear ratio between gears 23 and 24 make it possible to use the full mechanical rotation of the potentiometers 29 and thus more accurate output data is provided.

Viscous type dampers 30 are used to protect the precision potentiometers 29 and other precision parts from severe shocks. Fig. 2 of the drawing snows one of the dampers 30, and it can be seen that a damper wheel 31 is pinned to the shaft 25, and the damper case 32 is supported on the shaft 25 by sealed bearings 33. The rim 34 of the damper case 32 has teeth 35 and a latch bar 36, which is driven by a rotary solenoid 37, engages the teeth 35 of the rim 34 when the damper 30 is being employed. As shown in Fig. 5 of the drawing, when it is desired to release the damper 30, a button 38, which is located on top of the ball 18, is depressed which closes a switch 39 that is inside the ball 18. The closing of the switch 39 causes the solenoid 37 to be energized from a source of power and thus the solenoid 37 retracts the latch bar 36 and then the damper case is free to revolve about the shaft 25. In the preferred embodiment shown herein, the switch 39 is used to operate the dampers for botn potentiometers 29, however, separate switches could readily be employed, if so desired. If separate switches are used, each latch bar 36 would be connected to different solenoids 37 and if a single switch 39 is used, the same solenoid 37 could readily be used to operate the latch bars 36 for each damper.

The damper case 32 is filled with a viscous fluid and when the damper case 32 is latched the rotation of the damper wheel 31 causes a shearing action in the fluid to take place when the damper wheel 31 rotates relatively to the damper case 32, and thus there is a dampening of the motion of the shaft 25 on which the damper wheel 31 is pinned. When the damper case 32 is unlatched, it can rotate on sealed bearings 33 about the shaft 25 and therefore the damper wheel 31 and damper case 32 are free to rotate together and there would only be a slight amount of inertia and windage present and no fluid dampening.

In operation when the vertical shaft 17 is moved in direction B as designated in Figs. 1, 3 and 4 of the drawing, the yoke 15 is rotated in the inner race 16 of the ball bearing 14, relatively to the outer race of the bearing 14 which is press fitted in the circular retainer 13. The circular retainer 13 and the outer race of the ball bearing 14 cannot rotate with the inner race 16 because they are constrained by the disjointed shaft 12 which is supported in bearings 11. The shoes 20, which are riveted to the inner bore of the yoke 15, rotate with the yoke and drive the shaft 19. A gear train is connected between shafts 22 and 25 and the turning of the shaft 25 drives a potentiometer 29.

When the vertical shaft 17 is moved in direction A as designated in Figs. 1, 3, and 4 of the drawing the yoke 15 causes the bearing 14 and circular retainer 13 to revolve about an axis which is coincidental with the longitudinal axis of the disjointed shaft 12 and since the disjointed shaft 12 is secured to the circular retainer 13, it also will revolve and drive the second potentiometer 29 by means of a gear train.

It should be observed in Fig. 4 of the drawing that when the yoke 15 is being revolved about an axis that is coincidental with the longitudinal axis of the disjointed shaft 12, the pair of shoes 20 must revolve about the pin 22 that extends through the shaft 19, as the shaft 19 is only capable of rotation about its own longitudinal axis. Fig. 6 of the drawing shows that the use of the shoes 20 will eliminate any binding or cross coupling that would result if the pin 22 were connected directly to the yoke 15. If the pin 22 were connected directly to the yoke 15, bearings would be needed to support the pin 22 as there will be relative motion between the yoke 15 and the pin 22 whenever the yoke 15 is revolving about an axis that is coincidental with the longitudinal axis of the disjointed shaft 12. However the vector diagram of Fig. 6 shows that if the vertical shaft 17 is being moved in directions A and B simultaneously that the applied force 40 would result in one force 41 tending to rotate the shaft 19 about its longitudinal axis and that a second component force 42 would be a binding force which would be applied parallel to the longitudinal axis of the shaft 19.

In the device described herein, it can be seen that the shoes 20 are free to move in a direction parallel to the longitudinal axis of the shaft 19 and thus the mechanism will not bind.

Obviously many modifications and variations of the present invention are possible in the light of the above teachings. It is therefore to be understood that the invention may be practiced otherwise than as specifically described.

I claim:

1. A resolver mechanism for providing a plurality of outputs comprising, a housing, first and second mutually perpendicular shafts rotatably supported in said housing, a manually operable hand lever extending through an opening of said housing, a roller type bearing having its outer race secured to said first shaft, a yoke having said hand lever fastened thereto, said yoke having a tubular portion fastened inside the inner race of said roller type bearing, at least one shoe of spring material secured to the inside surface of said tubular portion, a pin extending diametrically through said second shaft, said at least one shoe being in slidable contact with said pin and movable in a direction parallel to the longitudinal axis of said second shaft, and dampening means for dampening the shaft rotation of each said first and second shafts.

2. A resolver mechanism as set forth in claim 1 wherein said dampening means for dampening the shaft rotation of each said first and second shafts comprises a viscous damper case rotatably mounted in said housing and containing viscous fluid, and a damper wheel inside said case and rotatable when one of said shafts is rotated.

3. A resolver mechanism for providing a plurality of outputs comprising, a housing, a first shaft rotatably supported in said housing, a second shaft rotatably supported in said housing and having its longitudinal axis perpendicular to the longitudinal axis of said first shaft, a hand-lever, a roller type bearing having its outer race secured to said first shaft, a yoke having said hand-lever fastened thereto and having a tubular portion fastened inside the inner race of said bearing, at least one shoe of spring material secured to the inside surface of said tubular portion, and a pin extending diametrically through said second shaft, said at least one shoe being in slidable contact with said pin and movable in a direction parallel to the longitudinal axis of said second shaft.

4. A resolver mechanism for providing at least two electrical outputs comprising; a housing; first and second mutually perpendicular shafts rotatably supported in said housing; a manually operable hand lever extending through an opening of said housing; a ball type bearing having its outer race secured to said first shaft; a yoke having said hand lever affixed thereto, said yoke having a tubular portion fastened inside the inner race of said ball type bearing; at least one shoe of spring material secured to the inside surface of said tubular portion; a pin extending diametrically through said second shaft, said at least one shoe being in slidable contact with said pin and movable in a direction parallel to the longitudinal axis of said second shaft; a first and second potentiometer fastened to said housing, said potentiometer having shafts therein; a first and second gear train for driving said first and second potentiometers respectively, one gear of said first gear train being on said first shaft and one gear of said second gear train being on said second shaft; and dampening means for dampening the shaft rotation of each said potentiometer.

5. A resolver mechanism as set forth in claim 4 wherein said dampening means for dampening the shaft rotation of each said potentiometer comprises a damper case rotatably mounted in said housing and containing viscous fluid, a damper wheel inside said damper case and rotatable when the potentiometer shaft is rotated, an engageable latch means for restraining rotation of said damper case, a rotary solenoid mounted to said housing and coupled to said engageable latch means, and means for energizing said solenoid.

References Cited in the file of this patent

UNITED STATES PATENTS

| | | |
|---|---|---|
| 589,890 | Binckley | Sept. 14, 1897 |
| 1,557,214 | McClane | Oct. 13, 1925 |
| 1,940,387 | Boykow | Dec. 19, 1933 |
| 1,987,733 | Tonbrune | Jan. 15, 1935 |
| 2,393,892 | Ganahl | Jan. 29, 1946 |
| 2,623,714 | Slater | Dec. 30, 1952 |
| 2,762,234 | Dodd | Sept. 11, 1956 |